United States Patent [19]

Osawa et al.

[11] 4,231,987
[45] Nov. 4, 1980

[54] METHOD OF STRIPPING A MOLDED ARTICLE

[75] Inventors: Masayuki Osawa; Masaoki Sekine, both of Saku, Japan

[73] Assignee: TDK Electronics Company Limited, Tokyo, Japan

[21] Appl. No.: 925,526

[22] Filed: Jul. 17, 1978

[30] Foreign Application Priority Data

Oct. 28, 1977 [JP] Japan .................................. 52/129457

[51] Int. Cl.² ............................................... B29F 1/14
[52] U.S. Cl. .................. 264/328.1; 264/334; 425/444; 425/556
[58] Field of Search ................ 425/556, 444; 264/328, 264/334

[56] References Cited

U.S. PATENT DOCUMENTS 3,910,740  10/1975  Rees .................................... 425/556

Primary Examiner—Thomas P. Pavelko
Attorney, Agent, or Firm—Oblon, Fisher, Spivak, McClelland & Maier

[57] ABSTRACT

A molding method comprises a step of fitting a movable mold to a stationary mold and filling a molten resin into a cavity formed by the mold fitting; a step of separating the movable molds; a step of releasing a molded product held by one or more push pins while shifting the push pins; a step of holding the molded product by a guide having a ⊐ shaped sectional view; and a step of releasing the molded product from the push pins to pass the molded product along the guide having a ⊐ shaped sectional view.

1 Claim, 12 Drawing Figures

(a)
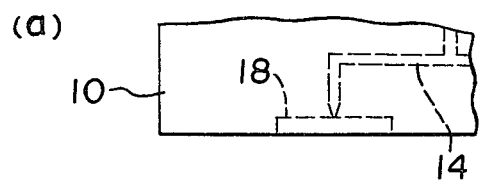
FIG. 3
(b)
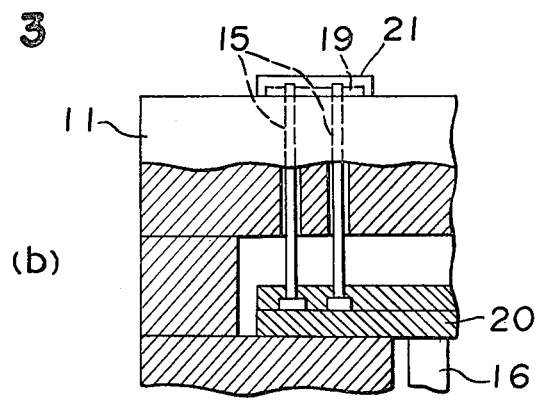
(a)
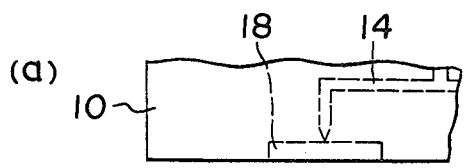
FIG. 4
(b)
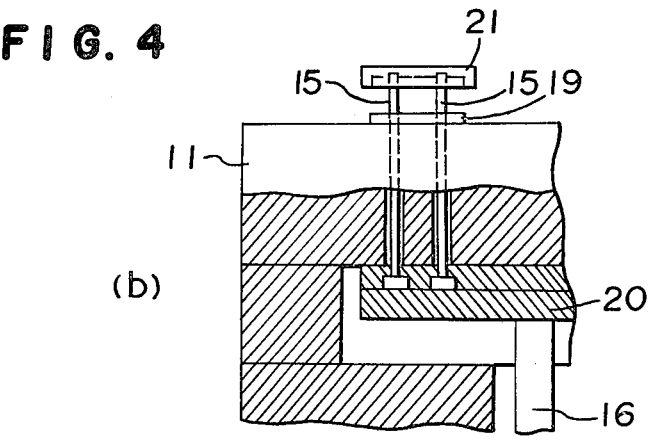

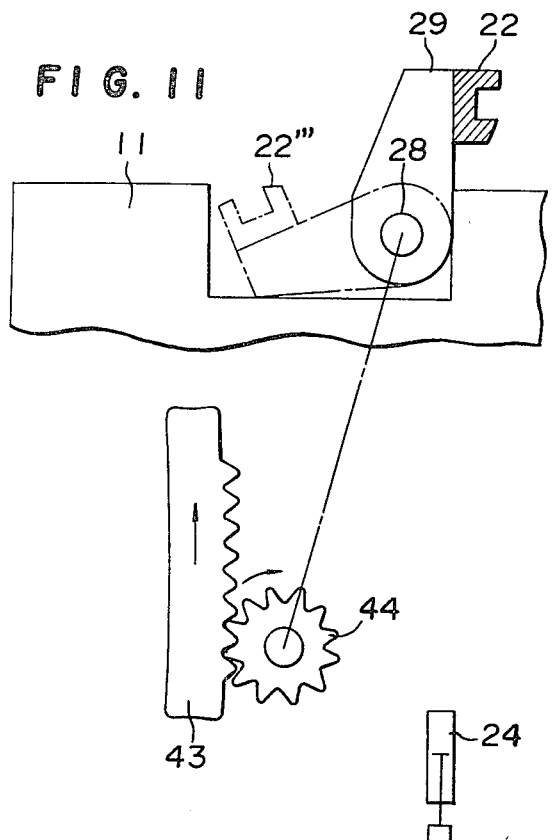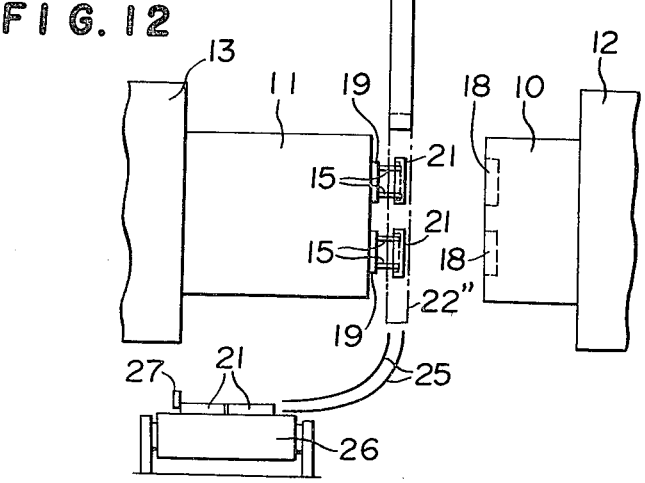

METHOD OF STRIPPING A MOLDED ARTICLE

BACKGROUND OF THE INVENTION

The present invention relates a method of molding a plastic etc. and a molding machine.

In the conventional method of molding a plastic etc., a molded product is put out from a female mold by using a push pin to freely fall down on a conveyor or to directly fall into a storage vessel at random so as to be arranged by a hand operation.

It has been proposed to pass the molded products through rails to a storage place (Japanese Unexamined Patent Publication No. 128754/1975). However, the molded products have not been smoothly guided to the storage place because of the construction for throwing the molded products to the position of the rails for the mold.

SUMMARY OF THE INVENTION

It is an object of the present invention to provide a molding method having high productivity while smoothly passing molded product without any damage.

The foregoing and other objects of the present invention have been attained by providing a molding method comprising a step of fitting a movable mold to a stationary mold and filling a molten resin into a cavity formed by the mold fitting; a step of separating the movable molds; a step of releasing a molded product held by one or more push pins while shifting the push pins; a step of holding the molded product by a guide having a ] shaped sectional view; and a step of releasing the molded product from the push pins to pass the molded product along the guide having a ] shaped sectional view.

BRIEF DESCRIPTION OF THE DRAWINGS

The drawings show certain embodiments of the molding machines used for the molding method of the present invention.

FIGS. 1 to 5 are partially enlarged sectional views for showing variation of steps;

FIGS. 9 to 12 are partially enlarged views for showing various embodiments for discharging the molded product and FIGS. 9 and 10 are partially sectional schematic views and FIG. 11 is partially enlarged view and FIG. 12 is a side view.

DETAILED DESCRIPTION OF THE PREFERRED EMBODIMENTS

Figure 1:
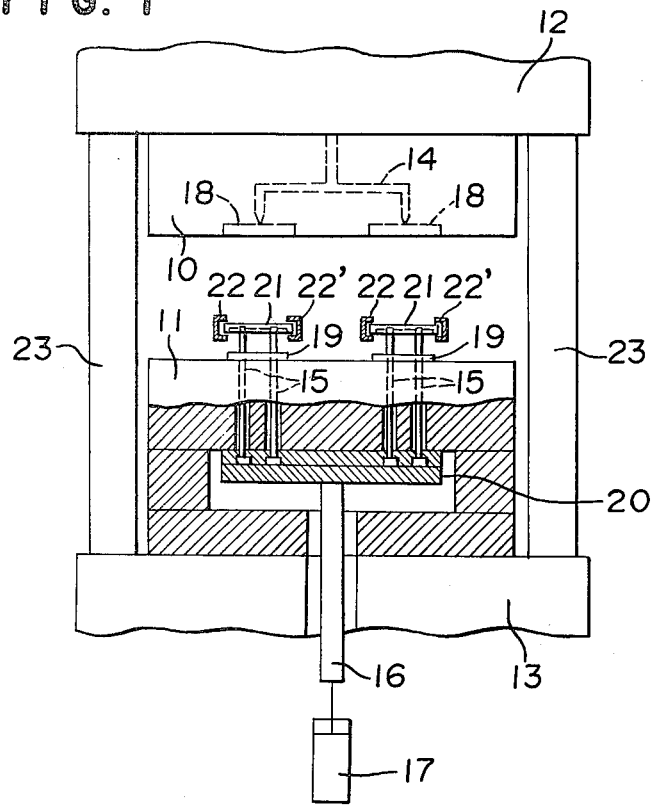

Referring to the drawings, the molding method of the present invention will be illustrated.

In FIG. 1, the reference numeral (13) designates a movable platen which slides under a guide of divers (23) fixed on a stationary platen (12). A stationary mold (10) is mounted on the stationary platen (12) and a movable mold (11) is mounted on the movable platen (13). Accordingly, the movable mold (11) is fitted to the stationary mold (10) by moving the movable platen (13) toward the stationary platen (12). On the contrary, the molds are separated by departing the movable platen (13) from the stationary platen (12).

Figure 2:
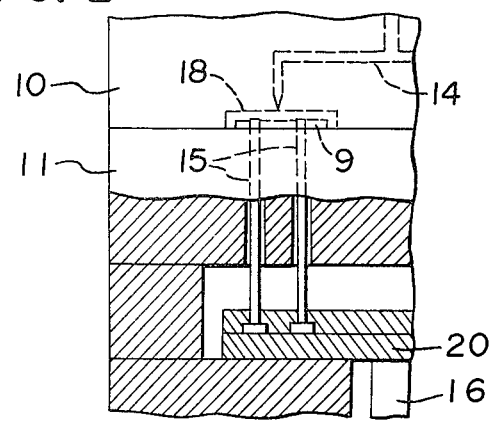

Thus, the molds are fitted and a molten resin is fed through a runner (14) from the side of the stationary platen (12) as shown in FIG. 2 while applying the pressure to the movable platen (13) and it is filled in a cavity of a space formed between a concavo part (18) and a core (19) to carry out the molding. After cooling the resin to be solidified, the mold separation for departing the movable mold (11) from the stationary mold (10) is carried out as shown in FIG. 3 and the molded product (21) is remained in the movable mold (11) under contacting with the core (19).

On the other hand, when a signal indicating the initiation of the mold separation is received, a pushing cylinder (17) is actuated as shown in FIG. 1 to move a push rod (16) toward the stationary platen (12) and to push a push plate (20). Push pins (15) mounted on the push plate (20) are passed through the core (19). The molded product (21) is released from the mold through the holes as shown in FIG. 4.

One of the significant advantages of the present invention is found in the releasing step.

In the conventional molding method, the edges of the push pins (15) are disposed at the same plan of the core (19) whereby when the push pins (15) are actuated to release the molded product (21) from the core (19), the molded product falls down under its dead weight.

On the contrary, in accordance with the present invention, at least one or more preferably several push pins (15) are projected for a slight distance from the core surface (19). Thus, the molded product (21) includes the push pins (15). Even though the push pins (15) are actuated to separate the molded product (21) from the core (19), the molded product (21) is still held by the push pins (15) as shown in FIG. 4.

Thus, rails having a ] shaped sectional view (22), (22') approach to the molded product (21) held by the push pins (15) so as to hold the molded product (21) from both sides by the rails as shown in FIG. 1.

The driving of the rails having a ] shaped sectional view will be further described by certain examples.

Figure 5:
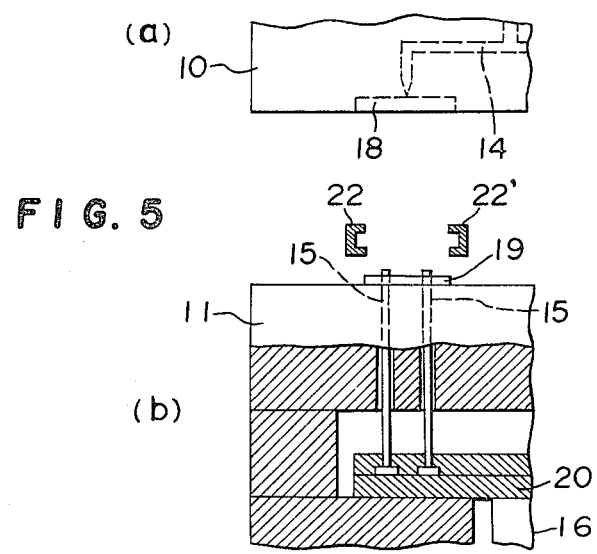

When the push cylinder (17) is actuated to return the push pins (15), the molded product (21) intends to return together with the push pins (15) however, the rails having a ] shaped sectional view (22), (22') hold the molded product (21) whereby the molded product (21) is released from the push pins (15) and the released molded product (21) falls down under the guidance of the rails (22), (22') as shown in FIG. 5.

The rails having a ] shaped sectional view (hereinafter referring to as the rail) will be described.

Figure 6:
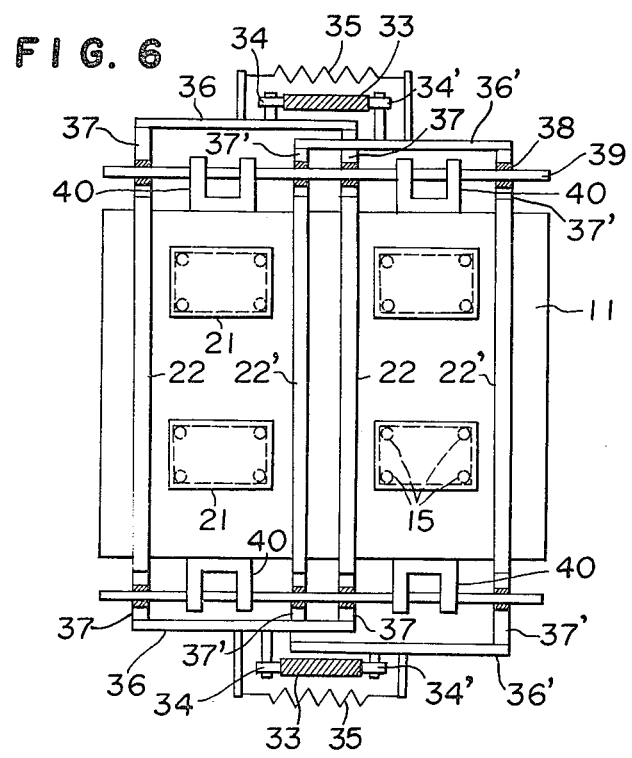
FIGS. 6 to 8 show the operation for discharging the molded product and FIG. 6 is a side view and FIGS. 7 and 8 are plan views under the different conditions (a spring (35) is omitted)
Figure 7:
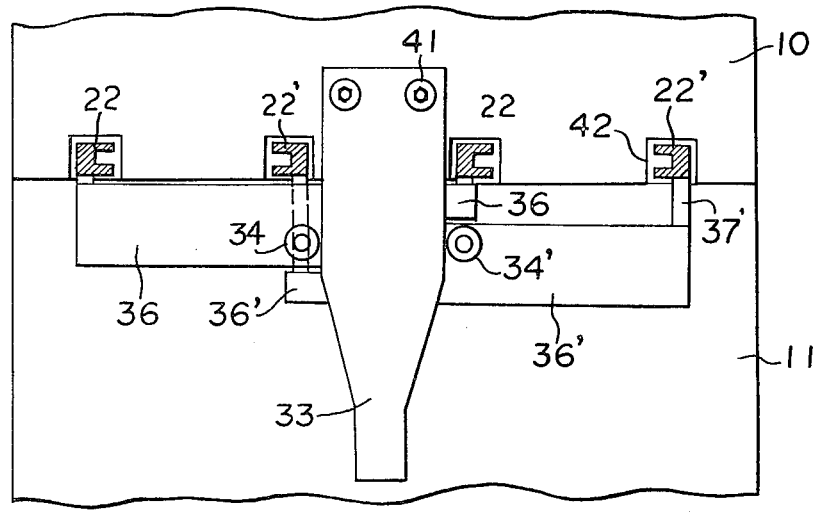

In FIGS. 6 and 7, the reference numeral (39) designates a shaft which is mounted on support blocks (40) mounted on the upper surface and the lower surface of the movable mold (11). Two pairs of slidable blocks B (37), (37') are fitted through the shaft (39). Each slide bearing (38) is buried in each of the slidable blocks B (37), (37') to make smooth sliding.

The slidable blocks B (37) are connected with a connecting plate (36) and the slidable blocks B (37') are connected with a connecting plate (36'). The rails (22) and (22') are respectively connected to the slidable blocks B (37) and (37'). The reference numeral (33) designates a plate cam having a projected portion and the sectional width is varied depending upon the mold fitting and the mold separation. The reference numerals (34), (34') designate cam followers mounted on each connecting plate (36), (36') and are always pushed on both side surfaces of the plate cam (33) with a spring (35).

When the sectional width of the plate cam (33) becomes narrow, the connecting plates (36), (36') are slided toward the center, whereby the rail (22) is shifted to the right side and the rail (22') is shifted to the left side so as to approach each other. When the sectional width of the plate cam (33) become wide, the connecting plates (36), (36') are outwardly slided from the center whereby the rail (22) is shifted to the left side and the rail (22') is shifted to the right side so as to depart each other.

Figure 8:
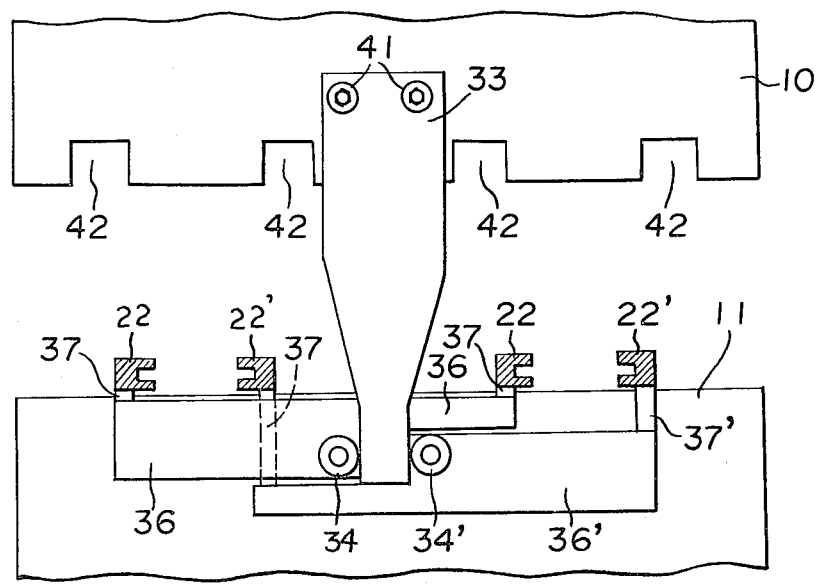

The reference numeral (41) designates a bolt for mounting the plate cam on the stationary mold (10) and (42) designates a relief groove formed on the stationary mold (10) for containing the rails (22), (22') during the time fitting the stationary mold (10) and the movable mold (11). When the molding step is finished and the detouching step is initiated, the cam followers (34), (34') are moved along the side surfaces of the plate cam (33) so as to deepen the cross of the connecting plates (36), (36'). The rails (22), (22') approach to the width for holding the molded product (21) and stop at the position of the narrowest width of the plate cam (33) as shown in FIG. 8.

Figure 9:
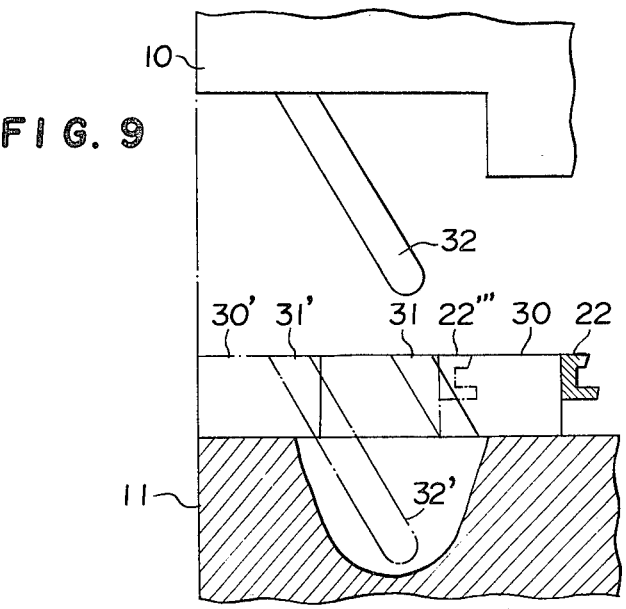

FIG. 9 shows the second embodiment of the present invention.

When the stationary mold (10) and the movable mold (11) are fitted, the angular pin (32) is at the position (32') while being inserted into a slant hole (31') formed in the slidable block (30').

When the mold releasing step is initiated, the angular pin (32) is departed from the movable mold (11) and the slant hole (31') is shifted toward the position (31) and the slidable block A (31') is shifted toward the position (30). Accordingly, the rail (22) is inwardly shifted.

The angle of the angular pin is reversed whereby the other rail is outwardly shifted.

When the molds are fitted, the angular pin (32) is inserted into the slant hole (31) whereby the rail (22) is returned to the position (22''').

Figure 10:
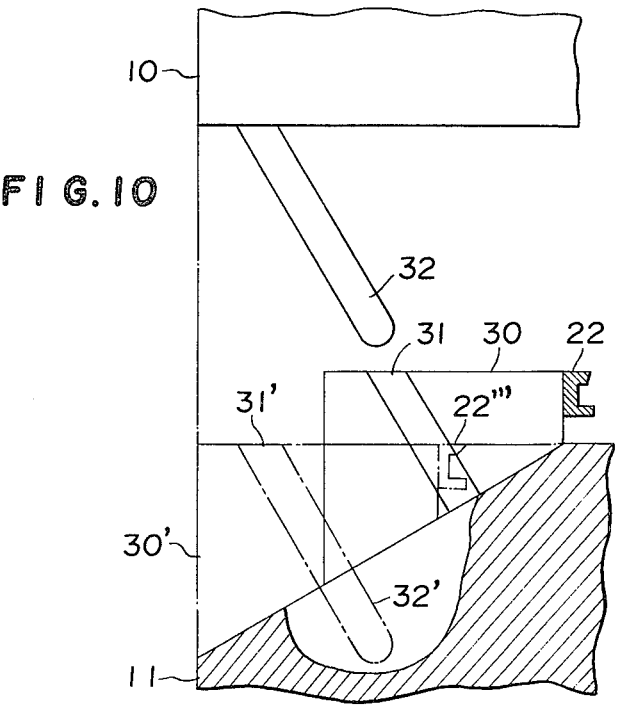

FIG. 10 shows the third embodiment of the present invention.

The angular pin (32) is used as in the second embodiment. Thus in this embodiment, a taper is given at the bottom of the slidable block A (30) whereby the slidable block A (30) is slided while rising. Accordingly, under the mold fitting condition, the slidable block A is at the position (30') whereby the rail (22) is not inwardly shifted. Accordingly, it is unnecessary to have a relief groove (42) for the rail in the first embodiment nor to have a step difference of the stationary mold in the second embodiment.

FIG. 11 shows the fourth embodiment.

A rack (43) molded on the stationary mold (FIG. 1 etc.) is moved to the arrow line direction by the mold separation, and a pinion (44) interlocked with the rack (43) is turned to the arrow line direction to rotate the shaft (28) whereby the rail (22) mounted on the rotary piece (29) is shifted from the position (22''') to the position (22).

In this embodiment, the rail (22) is not shifted under the mold fitting condition, and accordingly, the surface of the stationary mold can be flat as the same with that of the third embodiment.

FIG. 12 shows the fifth embodiment.

The cylinder for rail ascent and descent (24) is actuated by receiving a signal for the finish of the mold separation step and a signal for the finish of the push out of the molded product, whereby the rail (22) is shifted to the position (22'') and the molded product (21) held by the push pins (15) are held by the rails (22''). Then, the push pins (15) are returned while holding the molded product (21) by the rails (22'') so as to separate the molded product (21) from the push pins (15) and the molded product (21) falls down along the rails (22'') and the arrangement for the next step is given.

In this embodiment, the mold is not modified but only the timings of the push pins (15) and the mold operation are varied. The advantage of this embodiment is significant.

In the conventional operation, a molded product discharging machine has been used. Such machine has carried out many complicated operations such as a descent and a forward shifting of an arm, a suction, a reward shifting and an ascent, a direction change and a descent of the arm and a release of the molded product. Accordingly, it has disadvantages of high cost and low processability.

The reference numeral (26) designates a conveyor for passing the molded product (21) to the next step and (27) designates a stopper for preventing the falling of the molded product (21) over the conveyor (26). These parts are commonly used in all of the embodiments of the present invention.

In accordance with the molding method of the present invention, the molded products are smoothly passed whereby the productivity is high and the molded products are not injured.

What is claimed is:

1. A molding method comprising the steps of:
   contacting a stationary mold with a movable mold to form a mold cavity, said mold cavity having at least one push pin extending therein by a slight distance;
   filling said mold cavity with molten resin to form a molded product;
   separating said stationary and movable molds;
   extending said at least one push pin to separate said molded product from said core;
   holding said separated molded product by said at least one push pin;
   moving a pair of oppositely oriented guide rails having ] shaped sections adjacent said molded products being held by said at least one pin; and
   retracting said at least one pin to release said molded product from said at least one pin whereby said molded product may be guided by said pair of guide rails.

* * * * *